US009783263B2

(12) United States Patent
Bedard et al.

(10) Patent No.: US 9,783,263 B2
(45) Date of Patent: Oct. 10, 2017

(54) DRIVE TRACK FOR A TRACKED VEHICLE

(71) Applicant: BOMBARDIER RECREATIONAL PRODUCTS INC., Valcourt (CA)

(72) Inventors: Yvon Bedard, Orford (CA); Jean-Sebastien Pard, Tingwick (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/267,999

(22) Filed: Sep. 16, 2016

(65) Prior Publication Data

US 2017/0001689 A1 Jan. 5, 2017

Related U.S. Application Data

(62) Division of application No. 14/125,250, filed as application No. PCT/US2011/042316 on Jun. 29, 2011, now abandoned.

(51) Int. Cl.
*B62D 55/08* (2006.01)
*B62D 55/24* (2006.01)
(Continued)

(52) U.S. Cl.
CPC .............. *B62M 27/02* (2013.01); *B62D 55/00* (2013.01); *B62D 55/06* (2013.01); *B62D 55/07* (2013.01); *B62D 55/08* (2013.01); *B62D 55/14* (2013.01); *B62D 55/24* (2013.01); *B62D 55/244* (2013.01); *B62D 55/253* (2013.01); *B62M 2027/027* (2013.01)

(58) Field of Classification Search
CPC . B62M 27/02; B62M 2027/027; B62D 55/07; B62D 55/08; B62D 55/14; B62D 55/24; B62D 55/244; B62D 55/00; B62D 55/06; B62D 55/253
See application file for complete search history.

(56) References Cited

U.S. PATENT DOCUMENTS 3,436,128 A * 4/1969 Boulanger ........... B62D 55/244
305/167
3,582,155 A * 6/1971 Marier .................. B62D 55/24
305/167
(Continued)

OTHER PUBLICATIONS

International Search Report of PCT/US2011/042316; Nov. 9, 2011; Blaine R. Copenheaver.

*Primary Examiner* — Joseph Rocca
*Assistant Examiner* — Daniel Yeagley
(74) *Attorney, Agent, or Firm* — BCF LLP

(57) ABSTRACT

A tracked vehicle has a frame, a straddle seat connected to the frame, an engine, a pair of slide rails, at least two idler wheels, at least one drive sprocket, and a drive track The drive track has an endless belt, a plurality of external and internal lug, at least a number of the plurality of internal lugs forming two outer longitudinal rows, the belt having at least two contact surfaces, each contact surface being a surface where a corresponding one of the at least two idler wheels is in contact with the belt, a plurality of apertures and a plurality of alignment cleats disposed between the two outer longitudinal rows, and a plurality of lateral rods embedded within the belt and extending in the lateral direction. Both ends of at least a number of the plurality of lateral rods being disposed inwardly of the contact surfaces.

8 Claims, 5 Drawing Sheets

(51) Int. Cl.
*B62M 27/02* (2006.01)
*B62D 55/00* (2006.01)
*B62D 55/06* (2006.01)
*B62D 55/253* (2006.01)
*B62D 55/07* (2006.01)
*B62D 55/14* (2006.01)

(56) References Cited

U.S. PATENT DOCUMENTS

| | | | |
|---|---|---|---|
| 3,612,625 A | | 10/1971 | Huber |
| 3,619,012 A | | 11/1971 | Bizier et al. |
| 3,771,844 A | * | 11/1973 | Perreault ............. B62D 55/205 305/167 |
| 3,781,067 A | | 12/1973 | Dodson et al. |
| 3,799,627 A | | 3/1974 | Zwieg |
| 3,930,689 A | * | 1/1976 | Maki ..................... B62D 55/07 180/190 |
| 4,217,006 A | | 8/1980 | Dehnert |
| 4,474,414 A | * | 10/1984 | Tokue .................. B62D 55/202 305/166 |
| 4,546,842 A | | 10/1985 | Yasui |
| 5,174,638 A | | 12/1992 | Tokue et al. |
| 5,730,510 A | * | 3/1998 | Courtemanche ..... B62D 55/096 305/168 |
| 6,406,655 B1 | * | 6/2002 | Courtemanche ........ B29C 43/18 156/137 |
| 6,626,258 B1 | | 9/2003 | Forbes |
| 6,923,515 B2 | | 8/2005 | Konickson et al. |
| 7,014,004 B2 | | 3/2006 | Etou |
| 2009/0085398 A1 | | 4/2009 | Maltais |
| 2011/0074210 A1 | | 3/2011 | Paradis et al. |
| 2013/0134772 A1 | * | 5/2013 | Dandurand ............ B62D 55/04 305/178 |

* cited by examiner

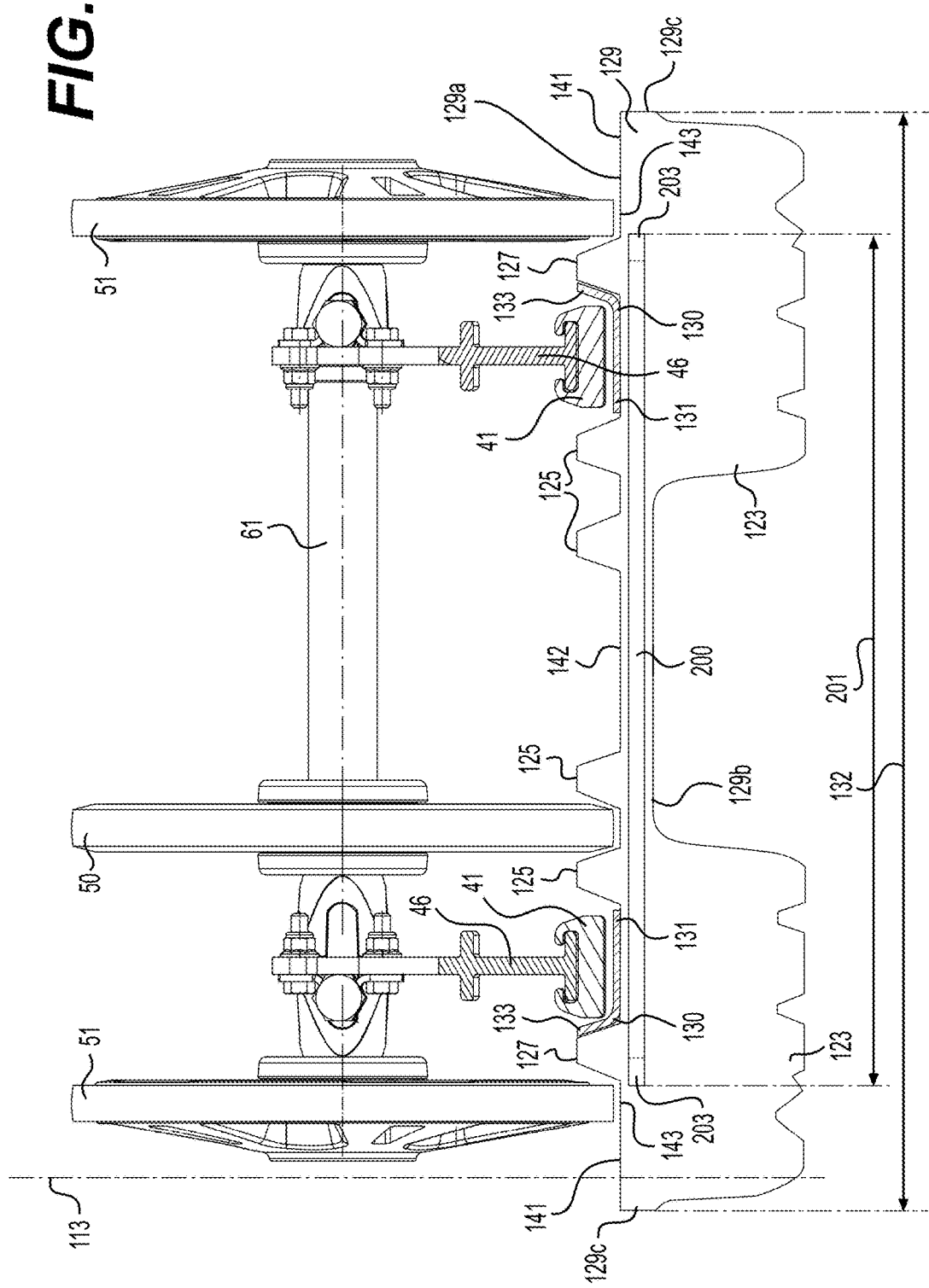

US 9,783,263 B2

DRIVE TRACK FOR A TRACKED VEHICLE

CROSS-REFERENCE

The present application is a divisional application of U.S. patent application Ser. No. 14/125,250, filed Dec. 10, 2013, which is a national stage application of International Patent Application No. PCT/US2011/042316, filed Jun. 29, 2011, the entirety of both of which is incorporated herein by reference.

TECHNICAL FIELD

The present invention generally relates to drive tracks for tracked vehicles.

BACKGROUND

Tracked vehicles conventionally have a drive track that includes an endless belt and a plurality of idler wheels.

A portion of a prior art drive track 128' is shown in FIG. 1. The drive track 128' has an endless flexible belt 129' which has an inner side 129a' and an outer side 129b'. The endless track 128' includes a plurality of external lugs (or ribs) 123' that project from the outer side 129b' to give the endless track 128' traction against the snow as the endless track 128' propels the vehicle, and a plurality of internal lugs 126' that project from the inner side 129a'. The plurality of internal lugs 126' defines four longitudinal rows of inner lugs 125' and two longitudinal rows of outer lugs 127'. The two longitudinal rows of outer lugs 127' are disposed outwardly of the four longitudinal rows of inner lugs 125'.

A slide frame assembly 44' primarily includes a pair of spaced apart slide rails 46' that engage the inner side of the drive track 128'. Two inner idler wheels 50' and two outer idler wheels 51' are rotatably connected to an axle 61' which extends laterally between the slide rails 46'. The outer idler wheels 51' are disposed outwardly adjacent to the outer rows of lugs 127'. A plurality of longitudinally spaced apertures (or windows) (not shown) are connected to the inner side 129a' of the endless belt 129'. The slide rails 46' are covered with slide shoes 41' and slide over the alignments cleats 130'.

A plurality of lateral rods 200' (only one being shown) extend laterally through the endless belt 129' at regular intervals along a length of the belt 129'. The lateral rods 200' provide reinforcement to the belt 129'. The rods 200' extend from one lateral side 129c' of the belt 129' to the other. The rods 200' are typically made of metal or fiber filled resin and the belt 129' is typically made of rubber.

When in operation, as the endless belt 129' is driven by sprocket wheels (not shown) that engage at least some of the lugs 125', 127' and windows and rotates around the idler wheels 50', 51'. As the belt 129' rotates, the rods 200' are successively disposed vertically between the idler wheels 50', 51' and the ground. These rods 200', which are vertically between the idler wheels 50', 51' and the ground, support the slide rails 46' and the idler wheels 50', 51'.

While the rods 200' provide reinforcement to the belt 129', they also increase a weight of the drive track 128'. Furthermore, the rods 200' limit a motion of the snowmobile when side hilling (i.e. moving at an angle with respect to the slope of the hill). Also, noise is generated when the idler wheels 50', 51' run over the rods 200'.

Therefore, there is a need for a drive track having a reduced weight while providing adequate structural resistance. There is also a need for a drive track that reduces noise generation. Finally there is also a need for a drive track that is suited for side hilling.

SUMMARY

It is an object of the present invention to ameliorate at least some inconveniences of the prior art.

In one aspect, a drive track for a tracked vehicle is provided. The drive track comprises a belt having an inner side and an outer side. The belt has a longitudinal direction and a lateral direction. The belt has two lateral sides. A plurality of external lugs is distributed on the outer side of the belt. The plurality of external lugs is adapted to be in contact with a ground. A plurality of internal lugs is distributed on the inner side of the belt. The plurality of internal lugs is adapted to be at least partially in contact with at least one drive sprocket of the tracked vehicle. At least some of the plurality of internal lugs is forming two outer longitudinal rows. Each of the two outer longitudinal rows is disposed next to a corresponding one of the two lateral sides of the belt. Regions of the belt disposed outwardly of the two outer longitudinal rows are deprived of internal lugs. A plurality of apertures is disposed laterally between the at least two outer longitudinal rows. A plurality of alignment cleats is disposed laterally between the at least two outer longitudinal rows. The plurality of alignment cleats forms two cleat longitudinal rows. A plurality of lateral rods is embedded within the belt. The plurality of lateral rods is extending in the lateral direction. Both ends of at least some of the plurality of lateral rods is disposed laterally inwardly of the regions of the belt disposed laterally outwardly of the two outer longitudinal rows.

In a further aspect, the regions of the belt disposed laterally outwardly of the two outer longitudinal rows are adapted to each receive a corresponding idler wheel of the tracked vehicle.

In an additional aspect, each end of the at least some of the plurality of lateral rods is laterally aligned with a corresponding one of the two cleat longitudinal rows.

In a further aspect, the plurality of the lateral rods is embedded in the belt between the inner side and the outer side of the belt.

In an additional aspect, each end of at least some of the plurality of lateral rods is laterally aligned with a corresponding one of the two outer longitudinal rows.

In a further aspect, the two outer longitudinal rows of internal lugs each have an outer edge. Each end of at least some of the plurality of lateral rods is laterally aligned with a corresponding one of the outer edges.

In an additional aspect, the plurality of alignment cleats is adapted to be contacting sliding rails of the tracked vehicle.

In a further aspect, the plurality of alignment cleats is disposed over every other portion extending longitudinally between two apertures.

In an additional aspect, the regions of the belt disposed outwardly of the two outer longitudinal rows are adapted to contact idler wheels of the tracked vehicle.

In yet another aspect, a tracked vehicle is provided. The tracked vehicle comprises a frame. A straddle seat is connected to the frame. An engine is mounted on an engine cradle portion of the frame. A pair of slide rails is connected to a bottom of the frame. The vehicle comprises at least two idler wheels. At least one drive sprocket is operatively connected to the engine. A drive track is operatively connected to the at least one drive sprocket for propelling the snowmobile. The drive track comprises an endless belt having an inner side and an outer side. The belt has a longitudinal direction and a lateral direction. The belt has two lateral sides. A plurality of external lugs is distributed on the outer side of the belt. The plurality of external lugs is adapted to be in contact with a ground. A plurality of internal lugs is distributed on the inner side of the belt. The plurality of internal lugs is at least partially in contact with the at least one drive sprocket. At least some of the plurality of internal lugs is forming two outer longitudinal rows. The two outer longitudinal rows are disposed near to a corresponding one of the two lateral sides of the belt. The belt has at least two contact surfaces. Each contact surface is a surface where a corresponding one of the at least two idler wheels is in contact with the belt. A plurality of apertures is disposed between the at least two outer longitudinal rows. A plurality of alignment cleats is disposed between the at least two outer longitudinal rows. The plurality of alignment cleats is forming two cleat longitudinal rows. The slide rails are contacting the plurality of alignment cleats. A plurality of lateral rods is embedded within the belt. Each of the plurality of lateral rods is extending in the lateral direction. Both ends of at least some of the plurality of lateral rods are disposed inwardly of the contact surfaces.

In a further aspect, regions of the belt outwardly of the contact surfaces are deprived of internal lugs.

In an additional aspect, each end of each of the plurality of lateral rods is laterally aligned with a corresponding one of the two cleat longitudinal rows.

In a further aspect, the plurality of lateral rods is embedded in the belt between the inner side and the outer side of the belt.

In an additional aspect, each end of each the plurality of lateral rods is laterally aligned with a corresponding one of the outer longitudinal rows.

In a further aspect, the outer longitudinal rows of internal lugs each have an outer edge. Each end of the at least some of the plurality of lateral rods is laterally aligned with a corresponding one of the outer edges.

In an additional aspect, each of the at least two idler wheels is connected to a rear of a corresponding one of the slide rails.

In a further aspect, the plurality of alignment cleats is disposed over every other portion extending longitudinally between two apertures.

In an additional aspect, the vehicle is a snowmobile. The snowmobile has at least one ski connected to the frame. The at least one ski being is disposed forward of the drive track.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where:

FIG. 5 is a cross-sectional view taken along a laterally extending vertical plane of a portion of the drive track of FIG. 3 shown with idler wheels mounted on an axle.

DETAILED DESCRIPTION

Figure 1:
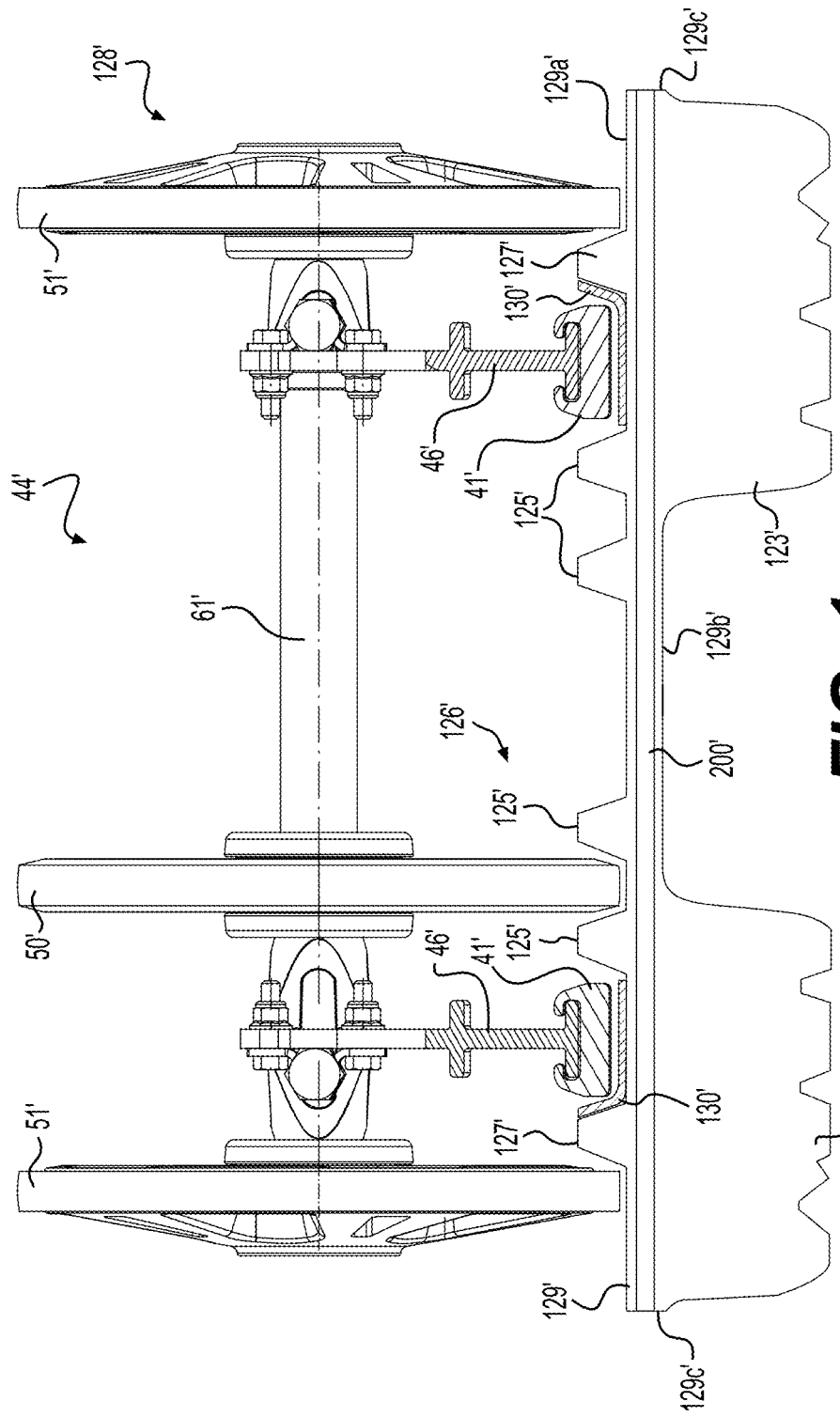
FIG. 1 is a cross-sectional view taken along a laterally extending vertical plane of a portion of a prior art drive track shown with idler wheels mounted on an axle.
Figure 2:
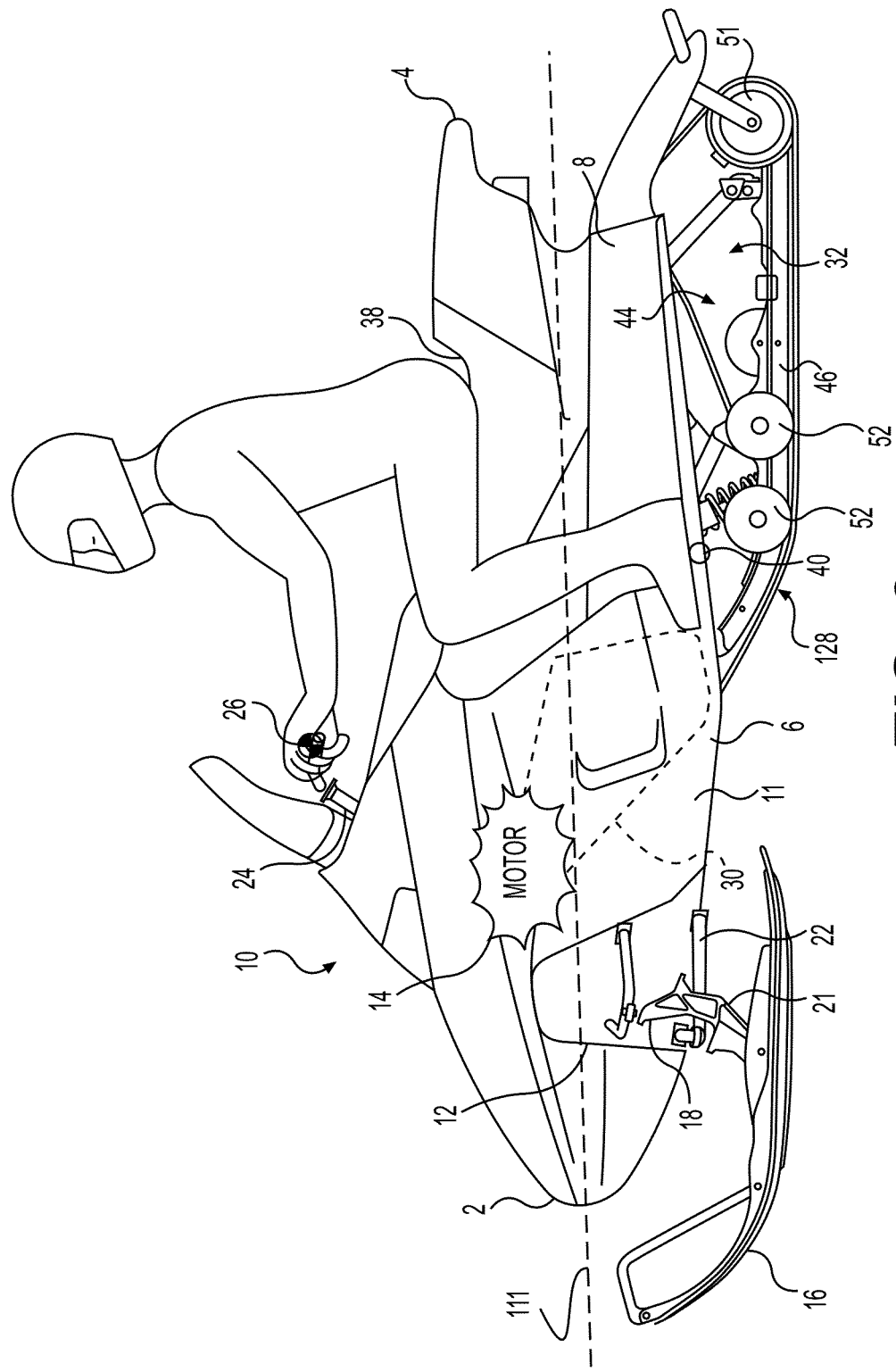
FIG. 2 is a left side elevation view of a snowmobile.

Referring to FIG. 2, a snowmobile 10 includes a front end 2 and a rear end 4, which are defined consistently with the forward travel direction of the vehicle. The snowmobile 10 includes a chassis 6 which normally includes a tunnel 8, an engine cradle portion 11 and a front suspension assembly portion 12. The snowmobile 10 has a longitudinal axis 111, about which the snowmobile 10 may slightly rotate when side hilling.

An engine 14 which is schematically illustrated, is carried by the engine cradle portion 11 of the chassis 6. A ski and steering assembly is provided, in which two skis 16 (only one of which is shown) are positioned at the front end 2 of the snowmobile 10, and are attached to the front suspension assembly portion 12 of the chassis 6 through a front suspension assembly 18. The front suspension assembly 18 includes ski legs 21, supporting arms 22 and ball joints (not shown) for operatively joining the respective ski legs 21, supporting arms 22 and a steering column 24. The steering column 24 at its upper end is attached to a steering device such as a handlebar 26 which is positioned forward of a rider and behind the engine 14 to rotate the ski legs 21 and thus the skis 16, in order to steer the vehicle.

A seat 38 extends from the rear end 4 of the snowmobile 10. Two foot rests 40 (only one of which is shown) are positioned on opposed sides of the snowmobile 10 below the seat 38 to accommodate the rider's feet.

An endless drive track 128 is positioned at the rear end 4 of the snowmobile 10 and is disposed under the tunnel 8. The endless drive track 128 is operatively connected to the engine 14 through a belt transmission system 30 which is schematically illustrated in broken lines. Thus, the endless drive track 128 is driven to run about a rear suspension assembly 32 for propulsion of the snowmobile 10. The endless drive track 128 is engaged with and driven by two drive sprockets 80 (shown in FIG. 4) which are journaled by the tunnel 8 and is driven by the engine 14 through the belt transmission system 30. The drive sprockets 80 are mounted on a drive axle 70 (shown in FIG. 4) which is driven in rotation by the engine 14.

The endless drive track 128 is suspended for movement relative to the chassis 6, by the rear suspension assembly 32. The rear suspension assembly 32 includes a slide frame assembly 44 which primarily includes a pair of spaced apart slide rails 46 that engage the inner side of the endless drive track 128. The rear suspension assembly 32 will be described below. A pair of slide shoes 41 (shown in FIG. 5) is disposed around each slide rail 46. The slide shoes 41 are made of UHWM PE (Ultra High Molecular Weight Polyethylene). The slide shoes 41 reduce the friction between the metal slide rails 46 and the metal alignment cleats 130. It is contemplated that the slide shoes 41 could be made of a hard plastic other than UHWM PE. The lateral rods 200 will be described in greater detail below.

The slide frame assembly 44 journals a plurality of rollers including two rollers 52, 55 and idler wheels 50, 51. The rollers 55 are carried by the rear suspension arm 64, in order to define the path over which the endless drive track 128 travels. The idler wheels 50, 51, which are sometimes called rear idler wheels, are rotatably connected to an axle 61 which extends laterally between the slide rails 46 at a rear of the slide rails 46. It is contemplated that the snowmobile 10 could have more or less rollers and idler wheels than the ones shown in the Figures.

The snowmobile 10 includes other elements, which will not be described herein.

Figure 3:
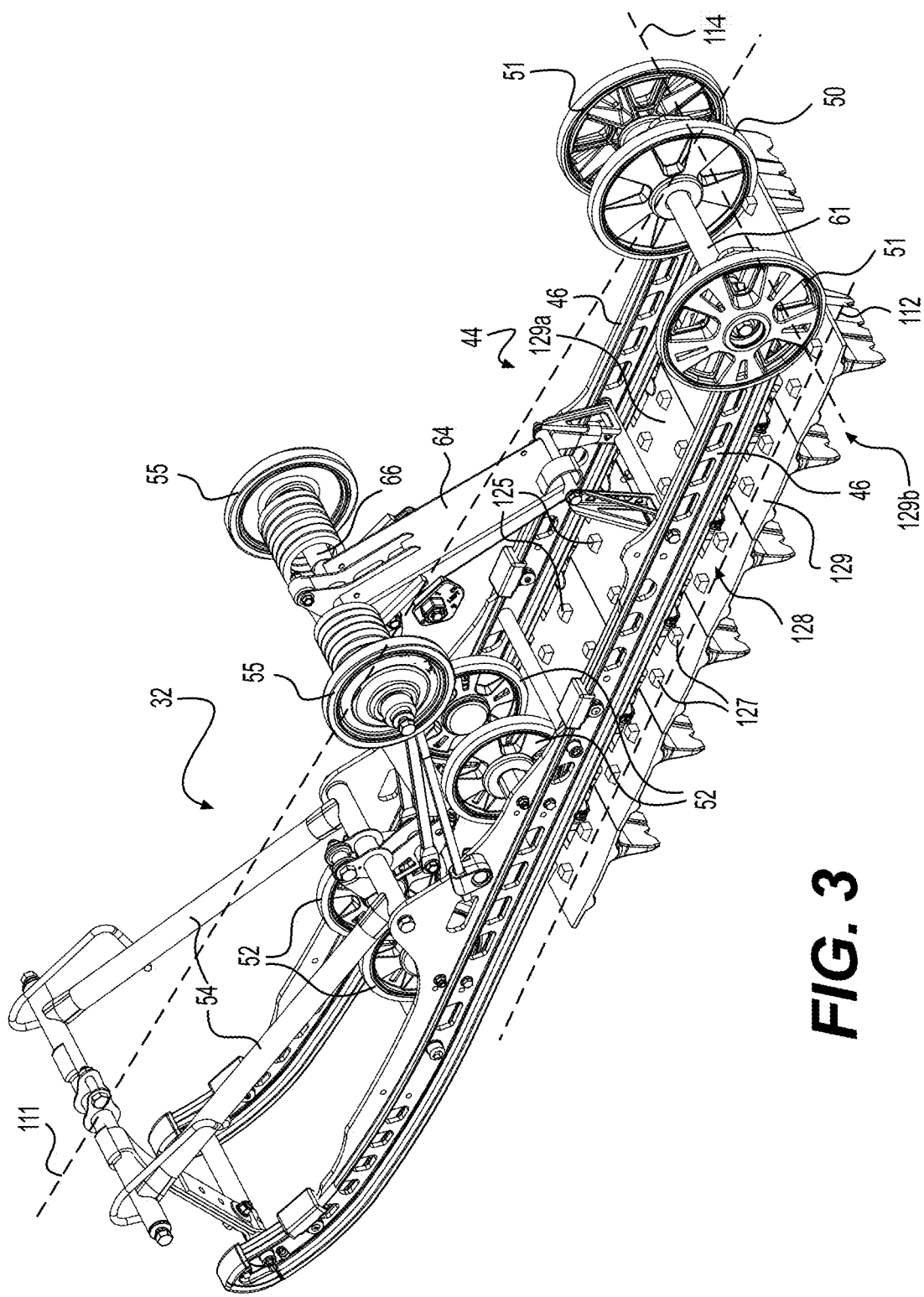
FIG. 3 is a perspective view taken from a rear, left side of a portion of a drive track and a suspension assembly of the snowmobile of FIG. 2.

Referring to FIG. 3, the rear suspension assembly 32 comprises left and right front suspension arms 54 and a single rear suspension arm 64. It is contemplated that the single rear suspension arm 64 could comprise left and right rear suspension arms. The front suspension arms 54 extend downwardly and rearwardly from a front portion of the tunnel 8. Upper ends of the front suspension arms 54 are pivotally attached to the tunnel 8, and lower ends of the front suspension arms 54 are each pivotally attached to their respective slide rails 46 of the slide frame assembly 44.

The rear suspension arm 64 extends downwardly and rearwardly from a rear portion of the tunnel 8, and are disposed rearward of the front suspension arms 54. The rear suspension arm 64 is pivotally attached to the tunnel 8 of the chassis 6 by means of a tube and shaft assembly. The tube and shaft assembly includes a tube 66 rotatably supported by a shaft (not shown) which is mounted at the opposite ends thereof to the tunnel 8. The shaft supports rollers 55, which support an upper portion of the endless drive track 128. An upper end of the rear suspension arm 64 is affixed to the tube 66, and a lower end of the rear suspension arm 64 is pivotally connected to the slide rails 46.

The rear suspension assembly 32 includes other elements, which will not be described herein.

Figure 4:
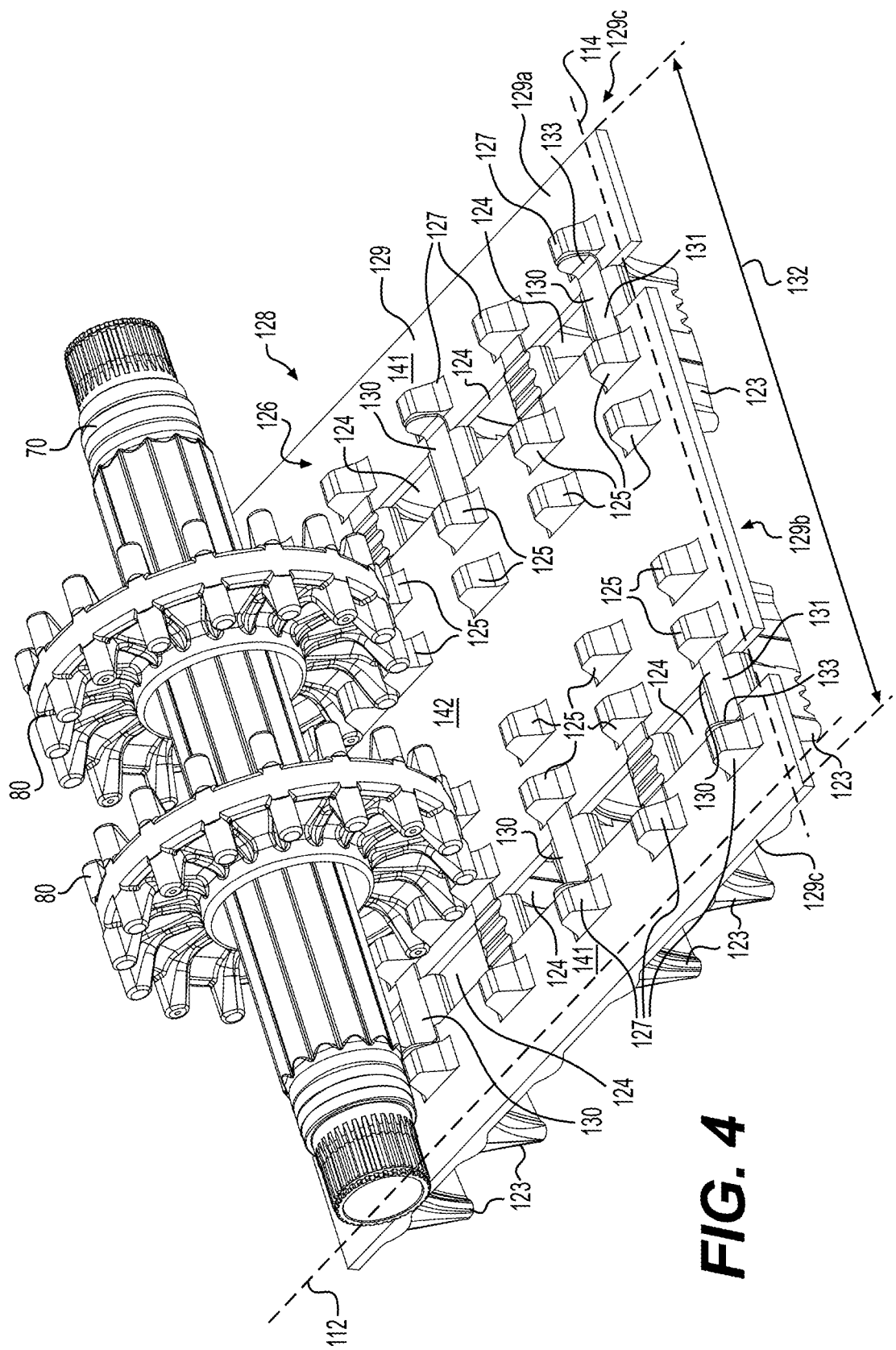
FIG. 4 is a perspective view taken from a rear, left side of a portion of the drive track of FIG. 3 shown with sprocket wheels.

Turning to FIGS. 4 and 5, the endless track 128 will now be described. The endless track 128 has an endless flexible belt 129. The flexible belt 129 has the inner side 129a, an outer side 129b and two lateral sides 129c. The endless track 128 includes a plurality of external lugs (or ribs) 123 that project from the outer side 129b to give the endless track 128 traction against the snow as the endless track 128 propels the snowmobile 10, and a plurality of internal lugs 126 that project from the inner side 129a. The endless track 128 has a longitudinal direction 112 and a lateral direction 114. A vertical direction 113 is perpendicular to both the longitudinal direction 112 and the lateral direction 114. The belt 129 has a width 132 in the lateral direction 114.

The endless track 128 is made of rubber. It is contemplated that the endless track 128 could be made of another strong, flexible material such as rubber reinforced with fabric and metal. The endless belt 129, the external lugs 123 and the internal lugs 126 are integrally formed with each other.

The plurality of internal lugs 126 includes two left and two right longitudinal rows of inner track lugs 125 and a left and a right longitudinal row of outer track lugs 127. The inner track lugs 125 are aligned with the outer track lugs 127 in the longitudinal direction 112. The outer track lugs 127 and the inner track lugs 125 are spaced with a same pitch. It is contemplated that the inner track lugs 125 could be offset from the outer track lugs 127 in the longitudinal direction 112. It is also contemplated that the outer track lugs 127 and the internal lugs 125 could have a different pitch. It is contemplated that a layout of the outer track lugs 127 and internal lugs 125 on the endless belt 129 could be different from shown in the Figures.

The outer track lugs 127 define three regions of the belt 129. Regions 141 are defined laterally between the outer track lugs 127 and the lateral sides 129c of the belt 129 they are next to, and a region 142 is defined laterally between the two rows of outer track lugs 127. The regions 141 are deprived of internal lugs 126. As best seen in FIG. 5, the regions 141 include contact surfaces 143 which are surfaces where the idler wheels 51 contact the belt 129.

As best seen in FIG. 4, the inner track lugs 125 come in contact with the two sprockets 80 for providing traction to the snowmobile 10. As best seen in FIG. 4, the outer track lugs 127 contact the slide rails 46 to ensure that the endless belt 129 stays in alignment. The slide rails 46 are sliding in a space defined between the outer track lugs 127 and inner track lugs 125 on the left side, and between the outer track lugs 127 and inner track lugs 125 on the right side. It is contemplated that that the internal lugs 126 could be in contact with sprockets other than the sprockets 80 mounted onto the drive axle 70.

A plurality of longitudinally spaced apertures (or windows) 124 are defined in the endless belt 129. The plurality of spaced apertures 124 is disposed into two longitudinal rows disposed laterally between the outer track lugs 127 and outer most of the inner track lugs 125. It is also contemplated that the plurality of longitudinally spaced apertures 124 could form only one or more than two rows.

The endless track 128 also comprises a plurality of alignment cleats 130 that are mounted adjacent onto the outer track lugs 127 and extend across every second one of portions longitudinally between two apertures 124 to the inner track lugs 125. The alignment cleats 130 include each a base portion 131 and a cleat portion 133. It is contemplated that the cleat portion 133 could be omitted. The cleat portions 133 of the alignment cleats 130 extend upwardly against sides of the corresponding outer track lugs 127. The base portions 131 of the alignment cleats 130 receive the pair of slide shoe 41 (left and right) thereon. The alignment cleats 130 comprise a strong, light, stamped sheet of steel. It is contemplated that other suitable material such as aluminum could be used to make the alignment cleats 130. It is also contemplated that the alignment cleats 130 could not be stamped but cast or molded into the desired shape.

Referring more specifically to FIG. 5, the lateral rods 200 will be described.

The lateral rods 200 are embedded in the belt 129 between the inner side 129a and the outer side 129b. The plurality of lateral rods 200 is incorporated to the belt 129 during molding of the belt 129. The rods 200 are made of fiber filled resin. It is contemplated that the rods 200 could be made of another material. For example, the rods 200 could be made of carbon fiber or steel. It is also contemplated that the rods 200 could be made of an other composite material. It is contemplated that the rods 200 could be different from each other. For example, they could have a different length 201 in the lateral direction 114 from each other, or a different material. The lateral rods 200 are disposed parallel to each other in the lateral direction 114 at a constant pitch and are laterally aligned. It is contemplated that the rods 200 could be offset from each other.

To allow edges 129c of the belt 129 to flex, the length 201 of the rods 200 is smaller than the width 132 of the belt 129, and the ends 203 of the rods 200 are positioned inwardly of the contact surfaces 143 of the idler wheels 51. As shown in FIG. 5, the ends 203 are laterally aligned with outer edges of the outer track lugs 127. As a consequence, the regions 141 can bend more than if the belt 129 had the prior art rods 200'. It is desirable that the regions 141 bend during side hilling, for example. Since, the regions 141 are deprived of internal lugs 126 and the ends 203 are laterally aligned with outer edges of the outer track lugs 127, the rods 200 do not directly support the outer idler wheels 51. It is contemplated that the ends 203 of the rods 200 could be positioned laterally inwardly from the outer edges of the outer track lugs 127. For example, as shown in dotted lines in FIG. 5, the ends 203 are laterally aligned with a center of the outer track lugs 127. In another example, the ends 203 are laterally aligned with the slide rails 46. In another example, the ends 203 are laterally aligned with outer edges of the slide rails 26. In yet another example, the ends 203 are laterally aligned with outer edges of the slide shoes 41. In another example, the ends 203 are laterally aligned with the alignment cleats 130.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A tracked vehicle comprising:
a frame;
a straddle seat connected to the frame;
an engine mounted on an engine cradle portion of the frame;
a pair of slide rails connected to a bottom of the frame;
at least two idler wheels;
at least one drive sprocket operatively connected to the engine;
a drive track operatively connected to the at least one drive sprocket for propelling the tracked vehicle, the drive track comprising:
an endless belt having an inner side and an outer side, the belt having a longitudinal direction and a lateral direction, the belt having two lateral sides;
a plurality of external lugs distributed on the outer side of the belt, the plurality of external lugs being adapted to be in contact with a ground;
a plurality of internal lugs distributed on the inner side of the belt, the plurality of internal lugs being at least partially in contact with the at least one drive sprocket, at least a number of the plurality of internal lugs forming two outer longitudinal rows, the two outer longitudinal rows being disposed near to a corresponding one of the two lateral sides of the belt, the belt having at least two contact surfaces, each contact surface being a surface where a corresponding one of the at least two idler wheels is in contact with the belt;
a plurality of apertures disposed between the two outer longitudinal rows;
a plurality of alignment cleats disposed between the two outer longitudinal rows, the plurality of alignment cleats forming two cleat longitudinal rows, the slide rails contacting the plurality of alignment cleats; and
a plurality of lateral rods embedded within the belt, each of the plurality of lateral rods extending in the lateral direction, both ends of at least a number of the plurality of lateral rods being disposed inwardly of the contact surfaces.

2. The tracked vehicle of claim 1, wherein regions of the belt outwardly of the contact surfaces are deprived of the plurality of internal lugs.

3. The tracked vehicle of claim 1, wherein the plurality of lateral rods is embedded in the belt between the inner side and the outer side of the belt.

4. The tracked vehicle of claim 1, wherein each end of each of the plurality of lateral rods is laterally aligned with a corresponding one of the outer longitudinal rows.

5. The tracked vehicle of claim 1, wherein the outer longitudinal rows of internal lugs each have an outer edge, and
each end of at least the number of the plurality of lateral rods is laterally aligned with a corresponding one of the outer edges.

6. The tracked vehicle of claim 1, wherein each of the at least two idler wheels is connected to a rear of a corresponding one of the slide rails.

7. The tracked vehicle of claim 1, wherein:
the plurality of apertures form two aperture longitudinal rows;
each one of the two cleat longitudinal rows being laterally aligned with a corresponding one of the two aperture longitudinal rows;
for each one of the two aperture longitudinal rows, belt portions of the belt extend longitudinally between pairs of apertures of the aperture longitudinal row; and
for each one of the two cleat longitudinal rows, alignment cleats of the cleat longitudinal row extend across every second belt portion extending longitudinally between each pair of apertures of the corresponding one of the two aperture longitudinal rows.

8. The tracked vehicle of claim 1, wherein the vehicle is a snowmobile, the snowmobile having at least one ski connected to the frame, the at least one ski being disposed forward of the drive track.

* * * * *